June 20, 1944.  A. L. COHEN  2,351,666
GLASS-LIFTING DEVICE
Filed Feb. 12, 1944
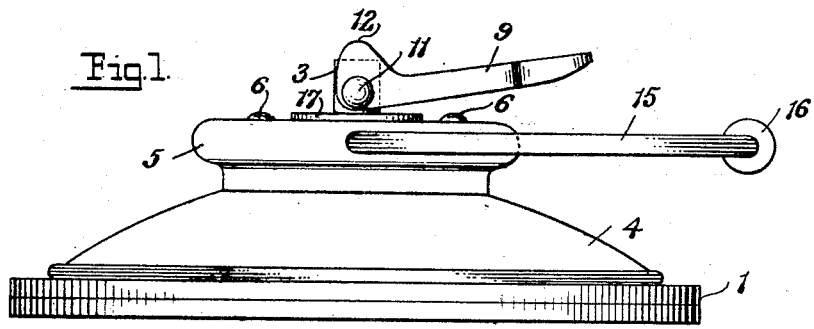
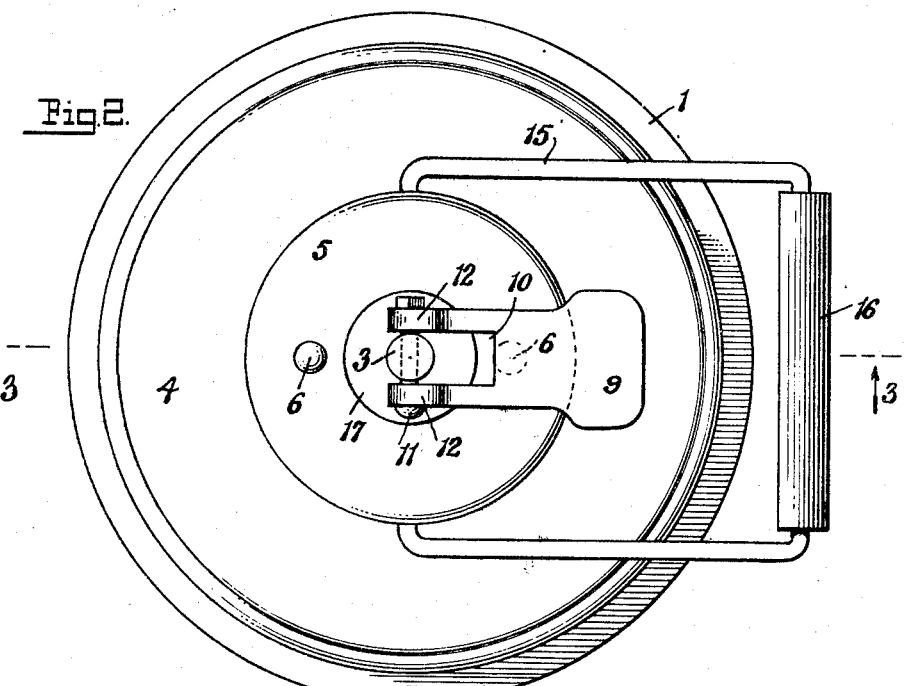
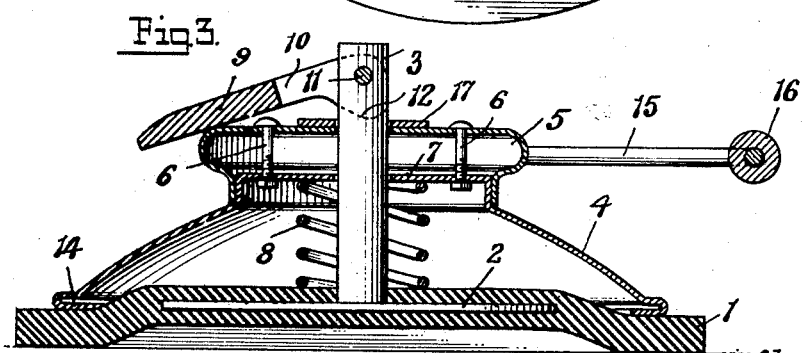
INVENTOR.
Abraham L. Cohen
BY
Harry Redzinsky
Attorney.

Patented June 20, 1944

2,351,666

UNITED STATES PATENT OFFICE 2,351,666

GLASS-LIFTING DEVICE

Abraham L. Cohen, Brooklyn, N. Y.

Application February 12, 1944, Serial No. 522,055

3 Claims. (Cl. 294—64)

This invention relates to a device for aiding in lifting and carrying panes or sheets of glass and similar smooth-surfaced articles or materials, and one of the objects of the invention is to provide a device of this character which can be easily attached to and removed from the surface of the articles to be carried; which will tenaciously attach itself to said surface by suction and permit the carrying of articles of very substantial weight and size without loosening its grip thereon.

More particularly, the invention contemplates the employment of a relatively thick, normally flat, disk of soft rubber or similar material, over which a rigid, cup-shaped member of less diameter than the disk, extends; the rubber disk having an embedded flat stiff circular plate carrying a stem extending through the cup and provided with a pivoted cam lever operative to force the cup toward the disk and cause the plate to form the disk into cupped shape so that a firm and secure adherence of the disk to a sheet of glass by suction, will result, enabling the glass or other smooth-surfaced material to be easily handled, lifted and carried.

In the accompanying drawing, wherein an embodiment of the invention is shown, Fig. 1 is a side elevation of a glass-lifting device constructed in accordance with the invention; Fig. 2 is a plan view of the same, and Fig. 3 is a sectional view on the line 3—3 of Fig. 2, looking in the direction of the arrows, and with the device shown in its operative or attached position.

With reference to the drawing, 1 indicates a circular section or disk of thick, soft rubber or other similar material such as artificial rubber or the like. The disk 1 is normally flat and may, if desired, be composed of a number of intimately united laminations, between which is located a smaller circular disk or plate 2, said plate being preferably of metal or other stiff and rigid material. The plate 2 is normally flat and remains so during the operation of the device, and it is of sufficient stiffness and rigidity to flex the rubber disk 1 into cupped formation, as hereafter described.

The rubber disk 1, if not composed of two or more united layers as heretofore explained, may be moulded around the plate 2 with the stem 3 rigidly attached to the plate 2 extending out of the rubber disk 1.

At 4 is shown a cup-shaped member, which is preferably a metal stamping. Said cup 4 is of less diameter than the rubber disk 1 and of greater diameter than the circular plate 2. The cup 4 is stiffened about its peripheral edge by the inturned flange 14 which presents a flat, annular face against the rubber disk near the periphery of said disk. Secured over the top 7 of the cup 4 is a cap member 5, which is firmly attached to the cup 4 by the bolts 6 or by any other suitable material, so that the cap member becomes in effect a part of the cup 4. If desired, the cap member 5 and the cup 4 may be fabricated from a single piece of metal.

The cup 4 and the cap 5 are both centrally apertured to permit the free passage of the stem 3. The outer portion of the stem 3 extending beyond the cap 5 has a pivot pin 11 on which is pivoted a cam lever 9, operative as hereafter described. The cam lever 9 is bifurcated at 10 to provide two end portions straddling the stem 3, the pivot pin 11 extending through the stem 3 and through said end portions. Each of said end portions is formed with a cam surface 12 operative against a plate or washer 17 located on top of the cap 5, to thereby depress the cup 4 or raise the plate 2. A coil spring 8, surrounding the stem 3 and located between the top plate 7 of the cup 4 and the upper face of the rubber disk 1, normally serves to keep the cup 4 and the disk 1 slightly separated when the cam lever 9 is in an inoperative position as shown in Fig. 1, thus also keeping the rubber disk 1 in a flat and unflexed condition.

The inoperative position of the device is shown in Fig. 1, wherein it will be observed that the cam lever 9 has its cam surfaces 12 located away from the top of the cap 5. At this time the disk 1 is perfectly flat, the coil spring 8 acting to hold the cup 4 loosely against the rubber disk 1 without the imposition of pressure thereon. To apply the device to the smooth surface of a sheet of glass or other smooth-faced article to be lifted and carried, it is placed with the exposed face of the rubber disk 1 against the glass while the parts are in the positions shown in Fig. 1. The cam lever 9 is then manually swung to the left and to the limit of its movement in that direction and to the position shown in Fig. 3. During this arcuate movement of the lever 9, the cam surfaces 12 exert downward pressure on the plate 17 to force the cup 4 firmly down on the rubber disk 1, and elevate the stem 3 and attached plate 2. The effect of such elevating movement of the plate 2 is to form the rubber disk 1 into the cupped shape shown in Fig. 3, thus creating a vacuum cup which adheres with great tenacity to the surface of the glass, and which will suctionally adhere thereto indefinitely until freed from such engagement by the cam lever 9 being swung back into the inoperative position of Fig. 1. When the pressure of the cam surfaces on the cap 5 is released, the coil spring 8 becomes effective to separate the parts 1 and 4 and permit the rubber disk 1 to flatten out. It will thus be apparent that the device may be quickly attached to a surface by merely placing it against the same and moving the pivoted cam lever 9 in the manner described. A bail 15, pivotally attached to the cap 5, and provided with a handle part 16, permits easy lifting and transportation of the glass to which the device is attached.

Having described one embodiment of the invention, it is obvious that the same is not to be restricted thereto, but is broad enough to cover all structures coming within the scope of the annexed claims.

What I claim is:

1. A device of the character described comprising, a soft and flexible rubber disk of substantial thickness and normally flat, a stiff circular plate of less diameter than the disk interposed in the body of the disk and covered and concealed by the material of the body of the disk, said plate having a central projecting stem, a stiff cup of less diameter than the rubber disk and of greater diameter than the plate, extending over the disk, said cup having a central attached raised portion provided with an aperture through which the stem projects, a cap fitted over the raised portion and having an end wall spaced from the top of the raised portion, a cam lever pivoted on the stem on the outside of said cap and operative against the end wall of the cap to force the cup toward the disk and form the disk into cupped shape, and a handle attached to the cap between the end wall thereof and the top of the raised portion of the cup.

2. A device of the character described comprising, a normally flat rubber disk, a circular stiff plate embedded in the disk, a relatively shallow stiff cup of less diameter than the disk extending over the disk, said cup having an inturned marginal edge portion presenting an annular, flat surface in contact with the top face of the disk near the edge of the disk, the cup having a central raised part, a cap fitted over said raised part and attached thereto, said cap having an end wall spaced from the top of the raised part, a stem in the form of a round rod rigidly attached to the plate, said raised part of the cup and the cap having aligned openings through which the stem extends, a cam lever pivoted on the stem on the outside of the cap and operative against the end of the cap to force the cup toward the disk and to form the disk into cupped shape, the cap being provided with diametrically opposite apertures communicating with the space between the end wall of the cap and the end of the raised part of the cup, and a bail-type handle having inturned ends entering into said apertures.

3. A device of the character described comprising, a normally flat rubber disk, a circular stiff plate embedded in the disk, a shallow stiff cup of less diameter than the disk and of greater diameter than the plate, extending over the disk, said cup having a marginal inturned edge to thereby present a flat annular surface against the disk near its peripheral edge, the cup being provided with a central, upstanding cylindrical raised portion having a flat top, a cap fitted over said cylindrical raised portion, said cap having an end wall spaced away from the top of the cylindrical raised part, fastening means extending through the end wall of the cap and through the top of the cylindrical raised portion for securing the cap in place, the end wall of the cap and the flat top of the raised portion having aligned openings, a stem on the embedded plate projecting through said openings, a spring between the cup and the disk, and cam means pivotally attached to the stem on the outside of the cup for forcing the cup toward the rubber disk and for forming the disk into cup-shape, and a handle pivotally attached to the cap.

ABRAHAM L. COHEN.